United States Patent Office 2,860,034
Patented Nov. 11, 1958

2,860,034

METHOD OF CONVERTING A FINELY-DIVIDED SUBSTANTIALLY ANHYDROUS SODIUM METASILICATE INTO A NON-DUSTING GRANULAR FORM

Isadore Mockrin, Philadelphia, Pa., assignor to Pennsalt Chemicals Corporation, a corporation of Pennsylvania No Drawing. Application January 28, 1955
Serial No. 484,815

5 Claims. (Cl. 23—110)

The present invention is drawn to the preparation of granular sodium metasilicate and more particularly to the conversion of finely-divided substantially anhydrous sodium metasilicate into a granular form.

It is frequently preferred to have an inorganic salt in a granular non-dusting form rather than in the form of a finely-divided powder. In the granular form the compounds are more readily handled, and when dry mixed with other materials, have less tendency to segregate. Most processes for preparing anhydrous sodium metasilicates generally result in a product which is fused or in a very finely-divided powder form. When the fused product is broken up as by crushing, the resulting mixture is usually a conglomeration of various sized particles mixed with a fine dust-like powder.

The primary object of the present invention is to convert such finely-divided anhydrous materials into a granular form in which the individual granules are of a substantially uniform size and free from any tendency to dust. The process of the present invention is based on the discovery that if a finely-divided anhydrous sodium metasilicate is blended with a sodium metasilicate penta or hexahydrate at a temperature between the melting temperature of the hydrate and that of the anhydrous salt, and the hydrate and anhydrous salt are present within specific proportions, a granular free flowing product of substantially uniform particle size will result.

In describing the invention the description is limited primarily to the use of sodium metasilicate pentahydrate since the hexahydrate is not commercially available. However, the product of co-pending application Ser. No. 484,814, filed January 28, 1955, which is an intimate mixture of sodium metasilicate hexahydrate and anhydrous sodium metasilicate intimately bonded together, has been used in place of the pentahydrate. The resulting product, as with the pentahydrate, is a substantially anhydrous sodium metasilicate of granular form.

The particle size of the hydrate, such as sodium metasilicate pentahydrate, should generally be less than about 8 mesh. Though commercial pentahydrates vary somewhat in particle size, their particle size is generally less than 8 mesh and the commercial pentahydrate can be used without further grinding. Finely-divided pentahydrate may also be used; however, the resulting granules are somewhat smaller. The particle size of the anhydrous alkali metal metasilicate is also not critical as long as the powder is reasonably finely-divided, particle sizes of —42 to +80 mesh having been granulated satisfactorily.

In practicing the present invention, the finely-divided anhydrous sodium metasilicate is mixed with the pentahydrate by any suitable means. Though the best proportions may vary somewhat, depending on the source of anhydrous powder used, the proportion of anhydrous alkali metal metasilicate to the pentahydrate should generally be within the range of 85 to 55 parts of anhydrous salt to 15 to 45 parts hydrate.

Blending of the mixture of anhydrous sodium metasilicate and sodium metasilicate pentahydrate is generally started at room temperature. During blending, the temperature is raised by heating generally to a maximum temperature of about 125° to 250° C. The granulation may be carried out at higher temperatures if desired as long as the temperature is not increased to above the melting point of the anhydrous sodium metasilicate. Also, little granulation occurs at temperatures much below 90° C.

Blending and heating are continued until a uniform granular product is obtained. This usually takes about 30 to 120 minutes. The product is a substantially anhydrous granular material containing about 2% combined water (sodium metasilicate pentahydrate contains about 42% by weight combined water).

The granulation is preferably carried out in an apparatus that is open to the atmosphere so that water can ecape. The blend may be swept with air or some other gas inert to the reactants to aid in the removal of the water. Air free of carbon dioxide is preferred.

When preparing granular anhydrous sodium metasilicate in small batches, it has been found that when appreciable amounts of sodium hydroxide are present in the powdered or finely-divided anhydrous sodium metasilicate used, some difficulty may be encountered in obtaining the desired granular product. The presence of small amounts of sodium hydroxide, however, does not appear to interfere with granulation when the batches consist of about one pound or more. Where the finely-divided anhydrous sodium metasilicate used is prepared by precipitation from an alkaline sodium metasilicate solution, as described in co-pending application Ser. No. 484,813, filed January 28, 1955, it may be desirable, particularly with small batches, to wash the precipitated anhydrous sodium metasilicate to remove any adhering alkaline mother liquor.

The following example will help to better illustrate the practice of the present invention:

*Example 1*

An electrically heated tumbler was charged with 325 parts by weight anhydrous sodium metasilicate of —200 mesh particle size and 139 parts by weight commercial sodium metasilicate pentahydrate of the following screen analysis:

| Mesh: | Percent |
|---|---|
| —10 +20 | 32 |
| —20 +42 | 50 |
| —42 +65 | 12 |
| —65 | 6 |
| | 100 |

On a weight percent basis the anhydrous powder was 70% and the hydrate 30% of the charge. The temperature of the charge was raised from room temperature to about 170° C. in 105 minutes while the tumbler was rotated at 10 R. P. M. This temperature was that of the air space in the center of the drum.

The resulting product consisted of white granules having the following screen analysis:

| Particle size: | Weight percent |
|---|---|
| +8 mesh | 10 |
| —8 +42 mesh | 68 |
| —42 +65 mesh | 12 |
| —65 mesh | 10 |
| | 100 |

The bulk density of the —8 +42 fraction was 52 lbs. per cu. ft. (loose) and 61 lbs. per cu. ft. (packed). The water content was about 2% by weight.

The granule size of the final product may be controlled to some degree by varying the particle size of the hydrate with which it is blended. The larger the particle size of the hydrate the larger the granules obtained.

The bulk density of the final product can also be controlled to some degree by varying the rate of heating to the temperature at which the granulation reaction is carried out. It has been found that the slower the rate of heating, especially between 70° and 150° C., the denser the final granular product. Products having a preferred density are obtained by raising the temperature of the mixture of the anhydrous sodium metasilicate and hydrate at a rate of about 0.7 to 2.5° C. per minute in the temperature interval of 70° to 150° C.

The bulk density of the final product can also be increased by increasing the hydrate content of the batch. For example, when the granular product is prepared by heating, with blending, 80 parts of anhydrous sodium metasilicate with 20 parts sodium metasilicate pentahydrate, the bulk density of the final product is 39 (loose) to 42 (packed) lbs. per cu. ft. However, if the sodium metasilicate pentahydrate content is increased so that there are present only 70 parts of anhydrous sodium metasilicate to 30 parts of sodium metasilicate pentahydrate, a product having a bulk density of 51 (loose) to 57 (packed) lbs. per cu. ft. is obtained.

The granular anhydrous products obtained by the practice of the present process have many advantages. They have a low hygroscopicity; there is little or no tendency to cake; the granules are sufficiently hard to maintain their shape, without crumbling, during normal blending with other materials; also, the products are more rapidly soluble in water than presently available commercial $Na_2SiO_3$ and have the advantage that there is essentially no combined water present. Thus, little shipping weight is taken up by combined water.

Having thus described my invention, I claim:

1. The method of converting a finely-divided substantially anhydrous sodium metasilicate into a non-dusting granular form comprising blending 85 to 55 parts by weight of said finely-divided substantially anhydrous sodium metasilicate with 15 to 45 parts by weight of a finely-divided sodium metasilicate hydrate of 5 to 6 molecules combined water, said blending being done at a temperature between the melting temperatures of said hydrate and said anhydrous sodium metasilicate and continuing said blending until a substantially uniform granular product is obtained.

2. The method of claim 1 wherein the hydrate is the pentahydrate.

3. The method of claim 1 wherein the hydrate is the hexahydrate.

4. The method of making a granular substantially anhydrous sodium metasilicate product comprising blending 55 to 85 parts of finely-divided anhydrous sodium metasilicate with 45 to 15 parts of finely-divided sodium metasilicate pentahydrate, heating said mixture to a temperature of 90° to 250° C. and continuing blending said mixture until a uniform product has been obtained.

5. The method of making a granular substantially anhydrous sodium metasilicate product comprising blending 55 to 85 parts by weight of a finely-divided anhydrous sodium metasilicate having a particle size of —42 mesh with 45 to 15 parts by weight of sodium metasilicate pentahydrate having a particle size of —8 mesh, heating said mixture, while blending, to a temperature of 125° to 250° C., said heating being at a rate of about 0.7 to 2.5° C. per minute.

References Cited in the file of this patent

UNITED STATES PATENTS

| | | |
|---|---|---|
| 2,067,227 | Baker | Jan. 12, 1937 |
| 2,161,515 | Jaeger et al. | June 6, 1939 |
| 2,282,018 | Baker | May 5, 1942 |
| 2,593,652 | Blanchard | Apr. 22, 1952 |

FOREIGN PATENTS

| | | |
|---|---|---|
| 868,962 | France | Oct. 20, 1941 |
| 451,689 | Great Britain | Nov. 5, 1934 |

OTHER REFERENCES

Merrill: "Chemistry of the Soluble Silicates," Jour. of Chem. Education (June 1947), pages 262–269.